Sept. 23, 1924.	J. H. WAGENHORST	1,509,382
AUTOMOBILE WHEEL RIM
Original Filed April 2, 1921
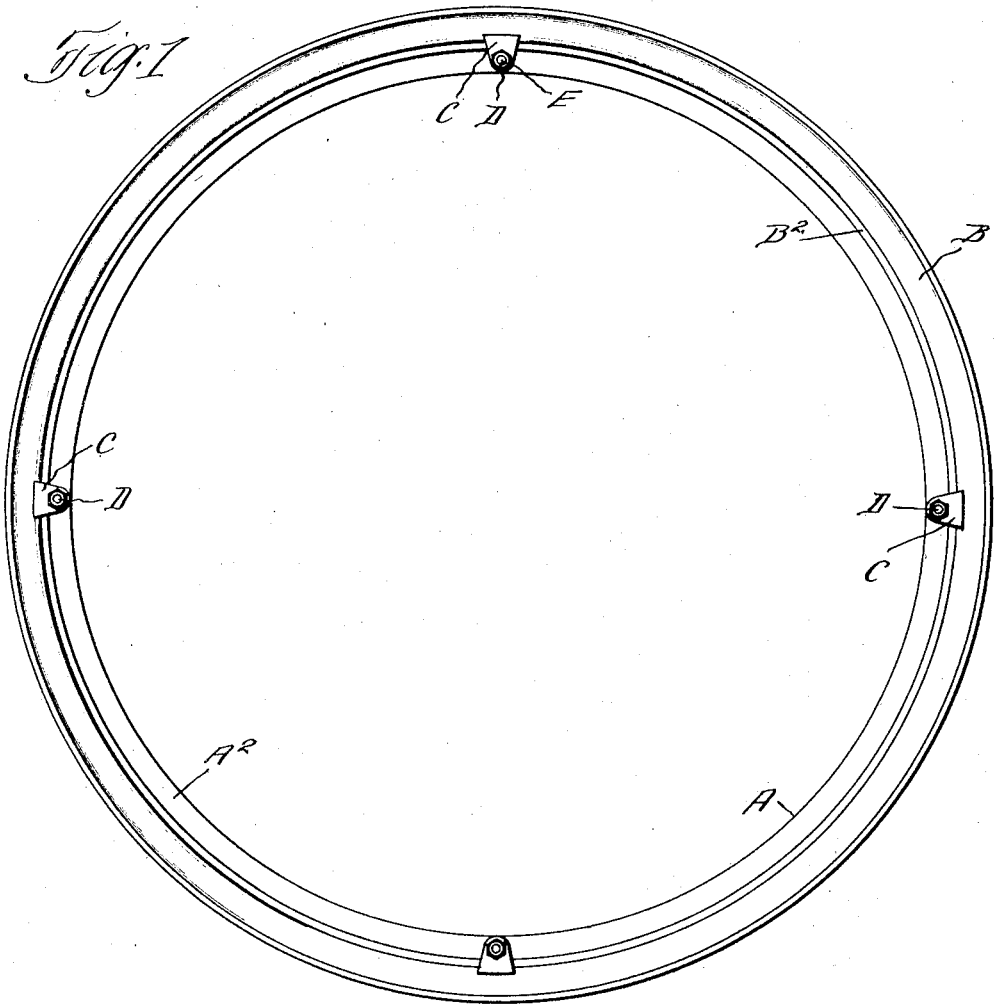
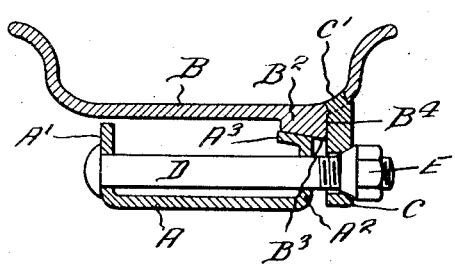
Inventor
J. H. Wagenhorst
By Hull Brock & West
Attys.

Patented Sept. 23, 1924.

1,509,382

UNITED STATES PATENT OFFICE.

JAMES H. WAGENHORST, OF JACKSON, MICHIGAN.

AUTOMOBILE WHEEL RIM.

Original application filed April 2, 1921, Serial No. 458,005. Divided and this application filed December 31, 1923. Serial No. 683,745.

*To all whom it may concern:*

Be it known that I, JAMES H. WAGENHORST, a citizen of the United States, residing at Jackson, in the county of Jackson and State of Michigan, have invented a certain new and useful Improvement in Automobile Wheel Rims, of which the following is a full, clear, and exact description, reference being had to the accompanying drawings.

This application is a division of my application No. 458,005, filed April 2, 1921. The invention relates generally to automobile wheels and particularly to a demountable tire carrying rim for use upon said wheel, the object of the invention being to provide a simple construction of rim and also a simple and efficient means for connecting said demountable rim to the fixed rim of a wheel body.

Another object of the invention is to connect a lug to the tire carrying rim in such a manner that a portion of said lug will fulcrum against a portion of the tire carrying rim under the stress exerted by the rim-securing nuts whereby a stronger and more durable connection between the lug and rim is obtained.

Another object is to provide a rim having an inwardly projecting rib which reinforces the front side of the rim and against which rib the lug is attached thereby eliminating the necessity of a tongue on the lug for support and providing at the same time, an abutment against which the lug will fulcrum to strengthen the lug connection against the draw of the bolt.

A further object of my invention is to provide an attached-lug rim construction such that the manufacture of the lugs is simplified and involves fewer operations and the lugs may, if desired, be made from a bar of simpler construction with a decided saving in stock or, if the lugs are forged, the forging dies may be much simpler and less complicated.

The invention consists in the novel features of construction and in the manner of combining or arranging the same, all of which will be fully described hereinafter and pointed out in the claims.

In the drawings forming a part of this specification Fig. 1 is a face view of a fixed rim of a wheel body having my improved construction of demountable rim connected thereto; and Fig. 2 is a transverse sectional view showing a rim provided with an inwardly projecting bead.

In the practical embodiment of my invention I employ a sheet metal fixed rim preferably in the form of a channel section and comprising a base portion A, an inner leg A' and an outer leg $A^2$. This outer leg may be provided with an inwardly projecting flange $A^3$ which may be inclined as shown or it may be straight.

In the drawings I have shown slight clearance between the tire carrying rim and the inner leg of the fixed rim but if desired the fixed rim could be shaped at this point for engaging contact with the tire carrying rim.

The tire carrying rim B comprises a base portion and tire engaging flanges at the sides thereof and the tire engaging flanges are shown integral with the base. In the construction shown in Fig. 2 the rim is provided with an inwardly projecting bead $B^2$ which is shown as having an inclined face $B^3$ and a straight outer side $B^4$.

For the purpose of securing the demountable tire carrying rim upon the fixed rim or wheel body, I employ a lug C having an opening to receive the felly bolt and it will be noted that this opening is somewhat larger than the bolt so that the demountable tire carrying rim with the lugs connected thereto can be readily positioned upon the fixed rim and the lugs passed over the ends of the bolts. The lugs are connected to the demountable rim by means of studs C' which are projected through openings produced in the rim and then riveted down.

The studs C' are reduced in thickness with reference to the thickness of the lug proper so that there is the shoulder at the end of the lug at one or both sides of the studs, and these shouldered portions of the lug come into contact with the inner face of the rim base when the studs are fitted into the openings in said rim base. During the riveting or upsetting of the studs, the shoulders provide the proper support or bearing both for the lug and the rim and bring about a much better riveting operation, drawing all of the parts firmly together.

In Fig. 2 the lug C is shown contacting with the straight outer face $B^4$ of the inwardly projecting bead $B^2$ and the studs C' of the lug are inclined or angled as shown to conform to the contour of the rims and the openings into which they are projected are preferably made in the curved or rounded portion of the rim as most clearly shown. A nut E is screwed upon the end of each felly bolt D and contacts with the lug C, the inner face of the nut being preferably coned and the opening in the lug being correspondingly counterbored. The lug C is secured to the rim so that it contacts with the inwardly projecting portion of said rim and fulcrums against such inwardly projecting portion of the rim when strain is placed upon the lug.

In demountable rim constructions of the attached lug type, it is important that the lugs should be firmly and rigidly secured to the rim in such a manner that they will not loosen or become displaced under the lateral stress exerted upon the lugs by the nuts which hold the demountable rim upon the fixed rim. In my Patent No. 1,383,679, issued July 5, 1921, I have disclosed a construction in which the lugs have riveting studs extending through apertures in the rim base and riveted or upset upon the rim base to secure the lugs in position. The construction disclosed in the present application comprises lugs having studs extending through apertures in the rim and fastened thereto as by riveting or upsetting the projecting ends of the studs. The rim has a portion with which the lugs co-operate so that the lateral strain exerted on the lugs by the securing nuts is resolved into a lateral strain on the studs and has no tendency to pull the studs through the apertures in the rim. In other words, the co-operation and co-action of the parts is such that the studs are placed in shear under the stress exerted, by the securing nuts and there is no tendency for the studs to pull through or move longitudinally of the apertures. This is important because the studs have maximum strength against shearing strains while the pulling through of the studs is resisted by the portions which have been bent over in the riveting or upsetting operation and such portions are relatively weak. The lug C engages the face B⁴ of the bead B² which projects inwardly from the rim base. The nut E exerts a force on the lug in the direction of the bead B². The lug fulcrums on the inner edge of the bead and acts as a simple lever of the first class with the result that the stress of the nut puts the studs C' in shear and does not exert a pulling tendency thereon. The bead or inwardly-projecting portion B² not only co-operates with the lug C, as has been pointed out, but it also reinforces and strengthens the rim adjacent the points at which the lugs are connected thereto. It may also provide a seat by which the demountable rim is seated on the fixed rim.

By connecting the lugs to the demountable rim in such a manner that contact is had with the inwardly projecting portion of said rim, a much stronger and more durable connection is had due to the fact that the strain is carried by the lug and inwardly projecting portion rather than upon the stud C' by which the lugs are connected. It will be understood that such changes and modifications can be made in this mode of connection without departing from the broad principle of the invention as defined in the following claims.

Having thus described my invention, what I claim is:—

1. A demountable tire-carrying rim having a rim base on which the tire seats, a portion projecting inwardly from said rim base, and apertures formed in said rim adjacent said inwardly projecting portion and in the curved or rounded portion of the rim base, and lugs having studs projecting into said openings and riveted to the rim base, the adjacent portions of the lugs contacting with the inwardly extending portion of the rim, whereby each lug will fulcrum against the inwardly projecting portion under lateral stress and prevent dislocation of the lugs.

2. A demountable tire-carrying rim having a rim base on which the tire seats, a portion projecting inwardly from said rim base, and apertures formed in said rim adjacent said inwardly projecting portion, and lugs having studs projecting into said openings and riveted to the rim base, the adjacent portions of the lugs engaging the inwardly extending portion of the rim, whereby said lugs will fulcrum against the inwardly projecting portion under lateral stress and prevent the pulling of said studs from said openings.

3. A demountable tire-carrying rim having a rim base on which the tire seats and a portion projecting inwardly from said rim base, said rim having openings formed therein adjacent said inwardly projecting portion, and a plurality of lugs having fastening studs projecting through said openings and upset, the body portions of said lugs contacting with said inwardly projecting portion and fulcruming thereagainst, whereby the tendency of the lugs to become dislocated under lateral tress is avoided.

4. A demountable tire-carrying rim having a rim base on which the tire seats and a bead extending inwardly from said rim base, said rim having openings formed therein adjacent said bead, and a plurality of lugs having studs extending through said openings and secured to the rim, said lugs fulcruming against said bead under lateral stress, whereby the tendency of the studs to pull through the openings is avoided.

5. A demountable tire-carrying rim having apertures formed therein and a plurality of lugs provided with studs extending through said apertures and secured to said rim, said lugs fulcruming under lateral stress on a portion of said rim to place said studs under shearing strain.

6. A demountable tire-carrying rim having apertures formed therein and a plurality of lugs having portions extending through said apertures, said rim having parts against which said lugs fulcrum under lateral stress to place the portions of the lugs in said apertures under shearing strain.

7. A demountable tire carrying rim having an inwardly projecting portion and openings in the rim base, said openings being inclined to the plane of the rim, and lugs attached to said rim, said lugs having inclined studs fitting in the openings in the rim base and riveted down, the lugs contacting with and bearing against the outer face of the inwardly projecting portion.

8. A demountable tire carrying rim having an inwardly projecting bead and inclined openings in the rim base adjacent to the bead, and lugs attached to said rim, said lugs having inclined studs fitting into the openings and riveted down, and shoulders upon the sides of said studs at the ends of the lugs contacting with the inner face of the rim base, the lugs contacting with and bearing against the outer face of the inwardly projecting bead.

9. A demountable tire carrying rim having an inwardly projecting bead, and openings in the rim base adjacent to said bead, and lugs attached to said rim and having studs fitting in said openings and riveted down, said lugs having shoulders upon opposite sides of the studs contacting with the inner face of the rim base, said lugs contacting with and bearing against the outer face of the inwardly projecting bead.

10. A tire carrying rim having an inwardly projecting rib and openings formed in the rim adjacent said rib, and a plurality of lugs having integral studs projecting into said openings and riveted down, said studs being at right angles to the rim at the point of connection, said lugs contacting with the contiguous face of the inwardly projecting rib.

11. The combination with a felly and bolts extending transversely therethrough, of a tire carrying rim adapted to be mounted on said felly and having an inwardly projecting portion and a plurality of apertures formed adjacent such portions, and a plurality of lugs having studs extending through said apertures and secured to the rim, said lugs being provided with openings receiving said bolts and nuts screwed upon said bolts and engaging said lugs whereby said lugs will fulcrum against the inwardly projecting portion of the rim under the lateral stress imposed by said nuts to place said studs under shearing strain.

12. The combination with a wheel body and transverse bolts carried by said wheel body adjacent the periphery thereof, of a tire carrying rim adapted to be mounted on the periphery of said wheel body and having apertures formed therein, and a plurality of lugs having portions extending through said apertures and other portions provided with openings to receive said bolts and nuts screwed on the ends of said bolts and engaging said lugs, said rim having parts against which said lugs fulcrum under the lateral stress imposed by said nuts to place the portions of the lugs in said apertures under shearing strain.

13. A demountable tire carrying rim having apertures formed therein and a plurality of lugs provided with portions fitting in said apertures and secured to said rim, said rim having portions against which said lugs fulcrum under lateral stress so as to tend to cause the portions of said lugs in said apertures to move laterally in a direction opposite to the stress exerted on the lugs.

14. The combination with a wheel body and transverse bolts carried near the periphery thereof, of a tire carrying rim mounted on the periphery of said wheel body and having a plurality of apertures formed therein, a plurality of lugs having portions fitting in said apertures, said lugs having openings receiving the transverse bolts, and nuts screwed on said bolts and engaging said lugs, said rim having portions forming fulcrums for said lugs whereby the portions of said lugs in said apertures will tend to move laterally in a direction opposite to the stress exerted by said nuts, said lugs being unsupported against the lateral stress of said nuts except by the connection of said lugs with the rim.

In testimony whereof, I hereunto affix my signature.

JAMES H. WAGENHORST.